(12) United States Patent
Fernandez Falces et al.

(10) Patent No.: US 10,018,178 B2
(45) Date of Patent: Jul. 10, 2018

(54) WIND TURBINE WITH BLADE PITCH SYSTEM

(71) Applicant: Acciona Windpower, S.A., Navarra (ES)

(72) Inventors: Sara Fernandez Falces, Navarra (ES); Gonzalo De Los Rios Leiva, Navarra (ES); Javier Gurbindo Seminario, Navarra (ES); Teresa Arlaban Gabeiras, Navarra (ES); Jose Luis Aristegui Lantero, Navarra (ES); Ander Gaston Lujambio, Navarra (ES); Jose Miguel Garcia Sayes, Navarra (ES); Miguel Nunez Polo, Navarra (ES)

(73) Assignee: ACCIONA WINDPOWER, S.A., Navarra (ES)

( * ) Notice: Subject to any disclaimer, the term of this patent is extended or adjusted under 35 U.S.C. 154(b) by 500 days.

(21) Appl. No.: 14/576,609

(22) Filed: Dec. 19, 2014

(65) Prior Publication Data

US 2015/0176567 A1 Jun. 25, 2015

(30) Foreign Application Priority Data

Dec. 19, 2013 (ES) .................................. 201331871

(51) Int. Cl.
*F03D 7/02* (2006.01)
*F03D 80/70* (2016.01)
(Continued)

(52) U.S. Cl.
CPC ......... *F03D 7/0224* (2013.01); *F03D 1/0658* (2013.01); *F03D 7/04* (2013.01);
(Continued)

(58) Field of Classification Search
CPC .... F03D 7/0224; F03D 7/0236; F03D 7/0244; F03D 7/0256; F03D 1/0658
See application file for complete search history.

(56) References Cited

U.S. PATENT DOCUMENTS 9,422,976 B2 * 8/2016 Handreck ............. F03D 1/0658
2008/0193295 A1 8/2008 Kirchner et al.
(Continued)

FOREIGN PATENT DOCUMENTS

DE 202006013519 U1 1/2007
EP 2336553 A2 6/2011
(Continued)

OTHER PUBLICATIONS

Virtual Machine Shop, 'Countersinking, Counterboring, and Spotfacing—4: Spotfacing', Wayback Machine, May 19, 2007.*
(Continued)

*Primary Examiner* — Richard Edgar
*Assistant Examiner* — John S Hunter
(74) *Attorney, Agent, or Firm* — Hayes Soloway PC

(57) ABSTRACT

The present invention relates to a wind turbine with blade pitch system with an angle between the longitudinal direction of the blade and axis of rotation of the bearing of the blade pitch system, disposing the driving plate of the blade pitch system between the blade and the bearing of the blade pitch system.

13 Claims, 5 Drawing Sheets

(51) Int. Cl.
*F03D 7/04* (2006.01)
*F03D 1/06* (2006.01)
(52) U.S. Cl.
CPC ........ *F03D 80/70* (2016.05); *F05B 2250/311* (2013.01); *F05B 2250/314* (2013.01); *F05B 2260/79* (2013.01); *Y02E 10/721* (2013.01)

(56) References Cited

U.S. PATENT DOCUMENTS

| | | | |
|---|---|---|---|
| 2011/0142645 A1* | 6/2011 | Nunez Polo | F03D 1/0658 416/149 |
| 2013/0216394 A1 | 8/2013 | Leonard | |
| 2013/0330199 A1* | 12/2013 | Bagepalli | F03D 1/0658 416/223 R |
| 2014/0003946 A1* | 1/2014 | Moore | F03D 80/00 416/174 |

FOREIGN PATENT DOCUMENTS

| | | | | |
|---|---|---|---|---|
| ES | 2379618 | | 12/2009 | |
| WO | WO 03060319 A1 * | 7/2003 | ........... | F03D 1/0658 |

OTHER PUBLICATIONS

MIT, Support and Connection Types, Wayback Machine, Oct. 1, 1999.*
Great Lakes Castings, The Benefits of Casting as a Manufacturing Process, Wayback Machine, Jul. 8, 2010.*

* cited by examiner

--Prior Art--

WIND TURBINE WITH BLADE PITCH SYSTEM

OBJECT OF THE INVENTION

The present invention relates to a wind turbine with blade pitch system with an angle between the longitudinal direction of the blade and the axis of rotation of the bearing of the blade pitch system, thus increasing the separation between the blade and the tower and reducing the loads in the actuator of the blade pitch system.

The object of the present invention is to provide a wind turbine blade pitch system in which the number of system components is reduced, thus reducing the number of connections between components, leading to a reduction in the number of assembly tasks and pre-stressed connecting bolt operations.

BACKGROUND OF THE INVENTION

The blade pitch system in wind turbines consists of a bearing on which the blade is attached. This bearing is joined by one part, i.e. the fixed or stationary part, to the hub, whilst the moving part is joined on one side to the blade and on the other side, the part located inside the hub, to a driving plate. The said blade, in turn, is connected, by means of a hydraulic or electric actuator, to the hub which makes the blade to rotate. In the case of a hydraulic actuator, the said actuator moves the driving plate through a ball joint system.

The driving plate has two functions: on the one hand it stiffens the hub, that is, it has a structural function and on the other hand it acts as a link in the blade pitch drivetrain system.

The bearing has the dimensions of the blade root and is generally a bearing in which the contacting surfaces with the blade and the driving plate are perpendicular to the axis of rotation of the blade pitch bearing so that the longitudinal direction of the blade is coincident with the axis of the bearing, wherein said driving plate in turn has its bearing contact surface perpendicular to the longitudinal direction of the blade.

However, it has been proven beneficial, due to the loads born by the wind turbine, that the axis of rotation of the blade pitch system and the longitudinal direction of the blade are not coincident, but rather have an angle between them such that the tip moves away from the tower so that when the loads are at a maximum, at the corner zone of the power curve, the blade, as the blade flexes, the center of gravity gets closer to the bearing axis of rotation The said loads on the blade and on the wind turbine are thus considerably reduced. This angle is called the preconing angle.

This geometric aspect is very important as it permits a lightening of the blade designs and of the other components of the wind turbine. To achieve the preconing angle there are two possible alternatives: arranging the surfaces of the moving bearing ring so that they are not parallel to their axis, by means of machining, as disclosed in European patent application EP2336553A1, or by machining the blade root to the required angle.

Machining the root of the blade to the required angle turns out to be impractical given the precision required for the said angle, so the usual choice is to machine the bearing, which increases the amount of material required for its manufacture, because the amount of raw material required is greater than that of the final bearing, where the difference is lost in the machining process.

It is also advantageous to have just one platform, i.e., one with the same wind turbine structural elements, namely the tower and nacelle elements, with the same dimensioning, such that the said platform may be valid for use with different sizes of blades and for different types of installation, thereby optimizing the cost of manufacture.

However, loads may vary from one wind turbine to another depending on the blade used, making it difficult to maintain the same platform. One way of resolving this is to customize the preconing angle for each rotor. It is therefore of great interest to employ methods and techniques that allow the distance between the blade and the tower to be easily adapted from one platform to another.

Wind turbine systems with blade pitch actuation systems known in the prior art comprise a bearing, a driving plate, a shaft or ball joint system and a hydraulic linear actuator, wherein the blade is arranged in contact with a first surface of the moving bearing ring, and the driving plate, also called pitch plate, is placed in contact with a second flank of the moving bearing ring facing the interior of the hub. The driving plate is connected to the actuator which is joined to the hub through a ball joint system. The fixed bearing ring is attached to the hub of the nacelle. The introduction of the ball joint system is necessary because the angle formed between the longitudinal axis of the blade and the rotational axis of the fixed bearing ring makes it necessary for the actuator to maneuver, rotating with a conical rather than cylindrical orbit. If the orbit was perfectly cylindrical the said ball joint system would not be necessary.

Furthermore, the driving plate and the shaft, or ball joint system, are manufactured separately and assembled subsequently, generally using bolts to connect them.

In European patent application EP2336553A1 the blade pitch system is given a preconing angle by machining the bearing so that the face that is in contact with the blade is not perpendicular to the axis of rotation of the blade pitch system.

However, since the wind turbines have very large blades, even exceeding 40 meters, a small error either in the machining or in the assembly results in a large error in the position of the blade tip. It is the distance between blade tip and the tower which determines in many cases, the dimensions of the blade structure; thus the machining of the bearing surface must be very precise and the tolerance must be very narrow. This greatly increases the cost of the bearing which must be machined and assembled with the rest of the components in a way so as to ensure the said angle, moreover the amount of waste material is greatly increased relative to a straight bearing.

All these problems are solved with the wind turbine blade pitch system of the present invention.

DESCRIPTION OF THE INVENTION

The present invention relates to a wind turbine with blade pitch system where the wind turbine comprises:
  at least one blade,
  a bearing with a fixed ring attached to a wind turbine hub and a moving ring
  a driving plate actuated by an actuator attached to the hub, where the driving plate is disposed between the blade and the bearing.

The wind turbine further comprises attachment means connecting the blade, the driving plate and the moving bearing ring.

Optionally, the driving plate is attached by a first side to the blade and by a second side to the moving ring of the bearing.

The driving plate has a rear face disposed in contact with the blade and a front face disposed in contact with a rear face of the moving ring of the bearing, where the rear face of the driving plate is perpendicular to the longitudinal direction of the blade and the front face of the driving plate is perpendicular to the bearing axis. The rear face and the front face of the driving plate form an angle between 1° and 5°.

The faces of the driving plate may be parallel or form an angle other than 0°, preferably an angle greater than 0° and less than or equal to 5°. This angle is the preconing angle, the angle between the axis of rotation of the blade pitch system bearing and the longitudinal direction of the blade.

Thus, the complexity of the blade pitch system is reduced to a single component, the driving plate, which adopts the necessary preconing angle for an adequate design of the wind turbine.

PREFERRED EMBODIMENT OF THE INVENTION

Figure 1:
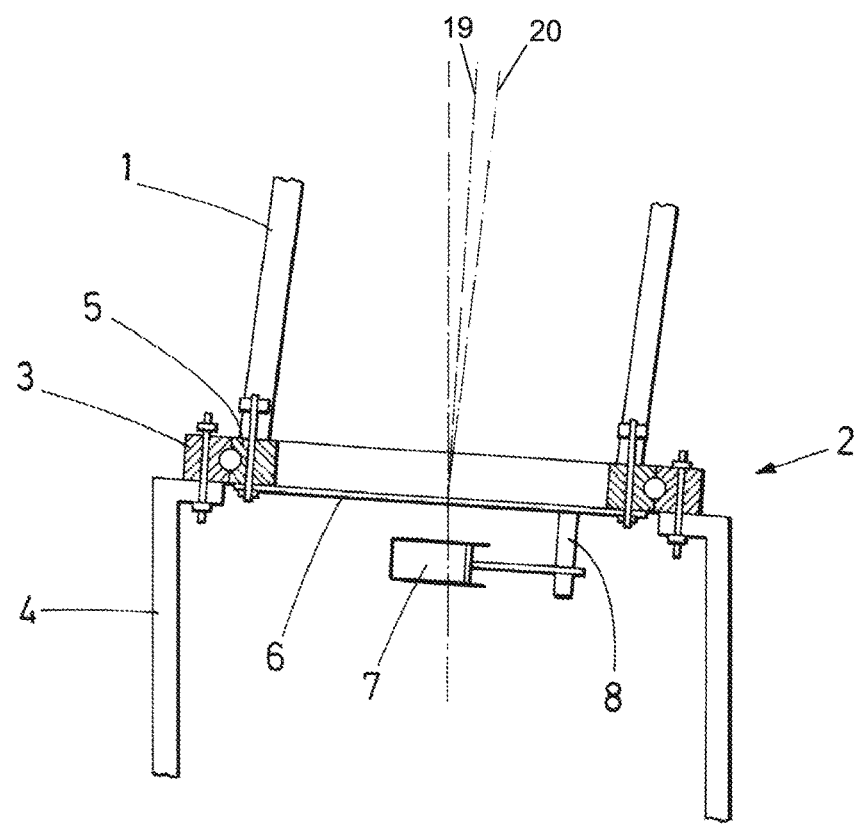
FIG. 1 shows a schematic view of a solution present in the prior art where the bearing is disposed between the blade and the driving plate and wherein the blade is given a preconing angle between the axis of rotation of the bearing and the longitudinal direction of the blade.

Referring to the figures, a preferred embodiment of the wind turbine blade pitch system, object of the present invention, is described below.

In one preferred embodiment, shown in FIGS. 2 to 5, the wind turbine comprises:
  at least one blade (1)
  a bearing (2) with a fixed ring (3) attached to a hub (4) of the wind turbine and a moving ring (5)
  a driving plate (6) driven by an actuator (7), said actuator (7) being joined to the hub (4) at a first end of said actuator (7), and joined to the driving plate (6) by a second end of the actuator (7) by means of a shaft (8) or ball joint system,
wherein the driving plate (6) is disposed between the blade (1) and the moving ring (5) of the bearing (2).

The actuator (7) is preferably a hydraulic actuator with a fixed housing joined to the hub (4) and a moving piston joined to the shaft (8) or ball joint system.

Figure 2:
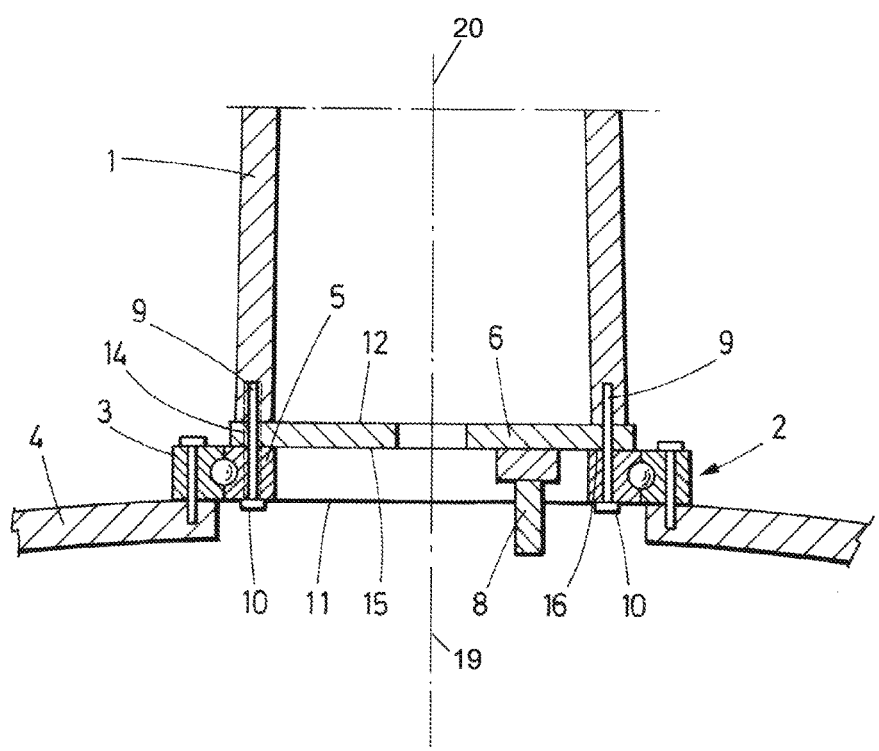
FIG. 2 shows a schematic view of the solution object of the invention where the preconing angle is 0°.
Figure 3:
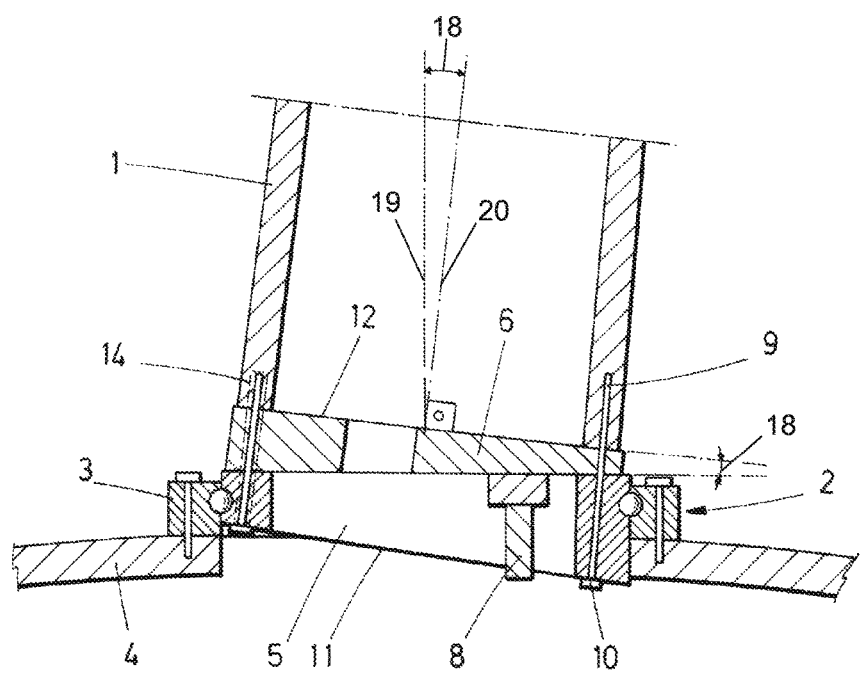
FIG. 3 shows a schematic view of a first example of the solution according to the invention where the preconing angle is other than 0°.
Figure 4:
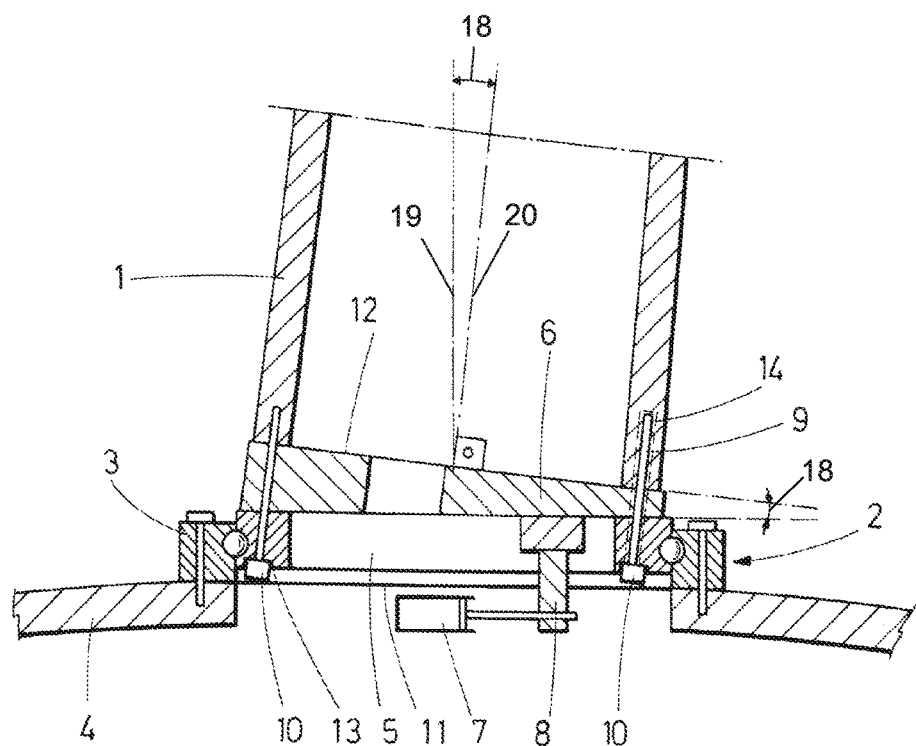
FIG. 4 shows a schematic view of a second example of the solution according to the invention where the preconing angle is other than 0°.

Furthermore, as shown in FIGS. 2 to 4, the driving plate (6) comprises a rear face (12) disposed in contact with the blade (1) forming an angle with a front face (15) of the driving plate (6) disposed in contact with a rear face (16) of the moving ring (5) of the bearing (2). This angle is the preconing angle (18): the angle between the axis of rotation (19) of the bearing (2) of the blade pitch system and the longitudinal axis (20) of the blade (1). This angle can be any angle from 0° to appropriate values for each wind turbine. Preferably the preconing angle will be between 1° and 5°, as shown in FIGS. 3 and 4.

As shown in FIGS. 2 to 4, the wind turbine further comprises attachment means (9, 10) that join the blade (1), the driving plate (6) and the moving ring (5) of the bearing (2), wherein said attachment means (9, 10) comprise bolts (9) arranged in holes (14) passing through the moving ring (5) of the bearing (2), the driving plate (6) and the root of the blade (1), bolts (9) which are arranged parallel to the longitudinal direction of the blade (1), optimally dividing load at the root of the blade (1), in the driving plate (6) and the bearing (2).

The attachment means (9, 10) further comprise nuts (10) that allow the assembly of the blade (1), the driving plate (9) and the moving ring (5) of the bearing (2) through the bolts (9) arranged in the holes (14) passing through the moving ring (5) of the bearing (2), the driving plate (6) and the root of the blade (1).

In a first embodiment, a front face (11) of the moving ring (5) of the bearing (2) facing the interior of the hub (4) is perpendicular to the longitudinal axis (20) of the blade (1) so that the bolts (9) continue to be parallel to the longitudinal direction of the blade (1) and the fixing nuts (10) rest in the front face (11) of the moving ring (5) of the bearing (2), and where additionally the front face (11) of the moving ring (5) of the bearing (2) is parallel to the rear face (12) of the driving plate (6), as shown in FIGS. 2 and 3.

This is advantageous both in the case of a preconing angle of 0° using a straight cylindrical bearing (2), i.e. comprising a moving ring (5), and a fixed ring (3) with straight cylindrical geometry, i.e. a conventional bearing (2), as shown in FIG. 2, as in the case of a preconing angle of between 1° and 5°. In the latter case, as shown in FIG. 3, the front face (11) of the moving ring (5) of the bearing (2) forms a right angle with the bolts (9), so it does not require additional machining for each nut to keep the bolts (9) parallel to the longitudinal direction of the blade (1) and to get a correct resting of the fixing nuts (10).

However, it is particularly advantageous to use straight cylindrical bearings and preconing angles of between 1° and 5°. In this case, the front face (11) of the moving ring (5) of the bearing (2) is not perpendicular to the longitudinal axis (20) of the blade (1), so that the bolts (9), being parallel to the longitudinal direction of the blade (1) are not perpendicular to the front face (11) of the moving ring (5) of the bearing (2) and the fixing nuts (10) do not rest properly on said front face (11), as the front face (11) of the moving ring (5) of the bearing (2) forms an angle other than 0° with the rear face (12) of the driving plate (6).

To solve this, in a second embodiment shown in FIG. 4, the front face (11) of the moving ring (5) of the bearing (2) facing the interior of the hub (4) comprises recesses (13) parallel to the rear face (12) of the driving plate (6) positioned in contact with the blade (1), so that the bolts (9) are disposed parallel to the longitudinal direction of the blade (1) and the fixing nuts (10) rest properly in these recesses (13), as shown in FIG. 4, where the bearing (2) is straight cylindrical.

In either of the above two embodiments, either the stretch of the holes (14) through the moving ring (5) of the bearing (2) forms an angle with the axis of rotation (19) of the bearing (2) equal to the preconing angle, i.e., the angle between the rear face (12) and the front face (15) of the driving plate (6), as shown in FIG. 4, or else the stretch of the holes (14) which pass through the moving ring (5) of the bearing (2) is parallel to the bearing axis and has a diameter which defines a housing in which the bolts (9) are disposed parallel to the longitudinal direction of the blade (1), as shown in detail in FIG. 3.

Figure 5:
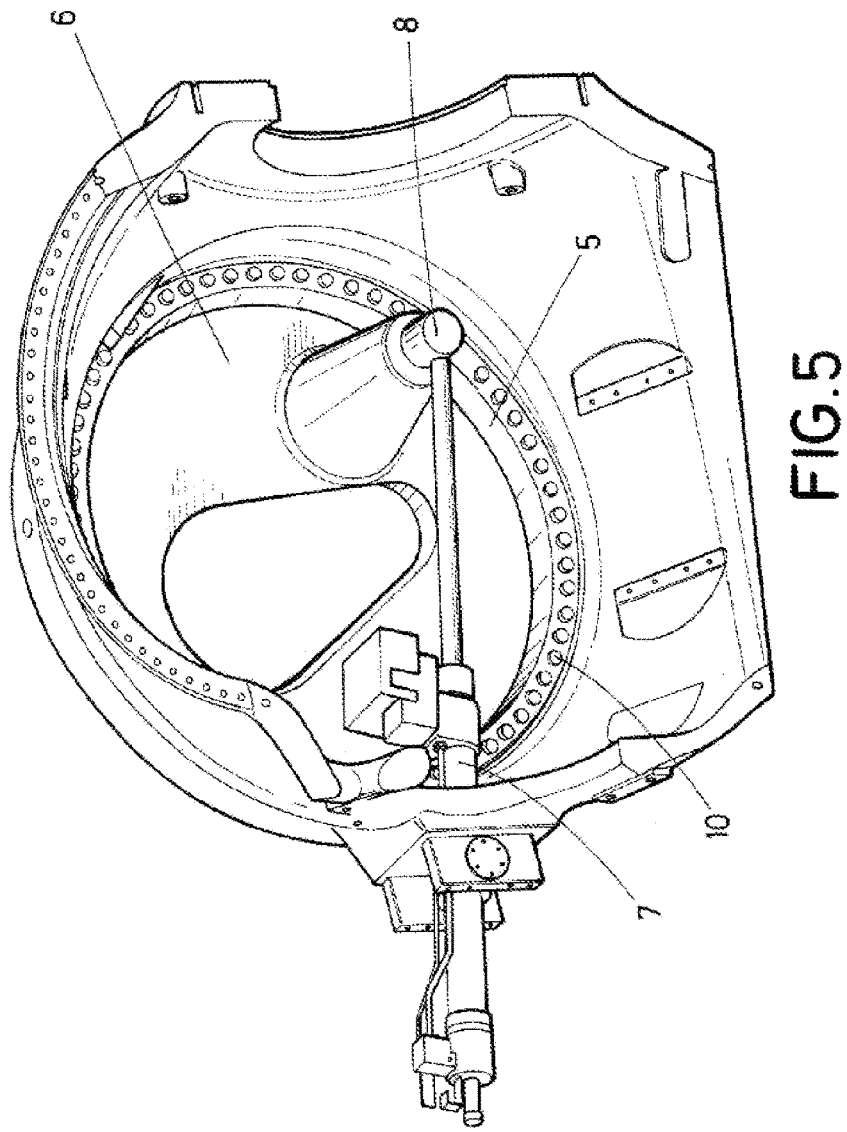
FIG. 5 shows a perspective view of the solution according to the invention in an embodiment in which the driving plate shaft of the blade pitch system is integrated into the driving plate.

The shaft (8) or ball joint system linking the actuator (7) with the driving plate (6) is located at least partially and preferably completely integrated into said driving plate (6) in another embodiment, shown in FIG. 5, as a protrusion of the driving plate, made up of a single piece. The function of said protrusion is to bring the surface of the plate at one end of the protrusion as close as possible to the point of attachment to the actuator (7). Consequently, the shaft (8) or ball joint system, if necessary, will be shorter and as a result of the reduction of the lever arm that it has to bear, will also be of smaller section than in the case without protrusion. Thus all or part of the dimensions of said shaft (8) or ball-axis system which connect the driving plate (6) to the actuator (7) are reduced, and simpler and cheaper elements can be used for the said attachment. Bolted connections between the shaft (8) and the driving plate (6) which also required machining of the mating surfaces of the two (6, 8) thereby increasing both the time and cost of the manufacturing process.

In this case, the actuator (7) is attached to the hub (4) at a first end of said actuator (7), and joined to the protrusion on the driving plate (6) at a second end of said actuator (7). Said protrusion is located eccentrically on the driving plate in such a manner that the force required to rotate the blade is as small as possible.

If the shaft (8) or ball joint system connecting the actuator (7) to the driving plate (6) is partially integrated into the driving plate (6), the dimensions (section) of the shaft (8) or ball joint system are reduced, as when its length, determined by the distance between the driving plate (6) and the point of application of the force of the actuator (7) is reduced, then the momentum created in the section where it joins with the driving plate (6) is decreased by the reduction of the lever arm.

In the case of partial integration, the shaft (8) or ball joint system may be a cylindrical pin joined by thermal interference to the driving plate (6) and machined to allow clearance (rotation about the axis) between a crankpin of the actuator (7) and the shaft (8) or ball joint system, the clearance being necessary to allow rotation of the bearing (2) by means of a linear actuator (7). Thus there are only fixing bolts (9) for the attachment of the driving plate (6) to the bearing (2) and to the blade (1).

Preferably, the attachment between the cylindrical pin and the protrusion (17) is adjacent to the crankpin of the actuator (7).

If the shaft (8) or ball joint system that connects the actuator (7) to the driving plate (6) is fully integrated into the driving plate (6) part of the protrusion will be machined which will provide the clearance described above.

Preferably this single part, where the shaft (8) or ball joint system is at least partially integrated into the driving plate (6), is made by casting. This manufacturing process allows the part to have complex geometries, such as, for example, the preconing angle or the joining into one part of two of the elements of the blade pitch system, such as the shaft (8) or ball joint system and the driving plate (6), as described and shown in FIG. 5.

The invention claimed is:

1. Wind turbine with blade pitch system wherein the wind turbine comprises:
    at least one blade,
    a bearing with a fixed ring attached to a hub of the wind turbine and a moving ring,
    a driving plate directly actuated by an actuator attached to the hub, wherein the driving plate is disposed between the at least one blade and the bearing,
   wherein the driving plate comprises a rear face disposed in contact with the at least one blade and a front face disposed in contact with a rear face of the moving ring of the bearing, wherein the actuator directly actuates on the front face of the driving plate disposed in contact with the rear face of the moving ring and wherein the rear face of the driving plate is perpendicular to the longitudinal direction of the at least one blade, and the front face of the driving plate is perpendicular to a bearing axis and wherein the rear face and the front face of the driving plate form an angle other than 0°.

2. The wind turbine with blade pitch system of claim 1 wherein the rear face and the front face of the driving plate form an angle between 1° and 5°.

3. The wind turbine with blade pitch system of claim 1 further comprising attaching means which in turn comprise bolts arranged in holes passing through the moving ring of the bearing, the driving plate and a root of the at least one blade, and nuts that allow the at least one blade, the driving plate and the moving ring of the bearing to be fixed in place by means of the bolts, for connecting the at least one blade, the driving plate and the moving ring of the bearing.

4. The wind turbine with blade pitch system of claim 3 wherein the bolts are arranged parallel to the longitudinal direction of the at least one blade.

5. The wind turbine with blade pitch system of claim 4 wherein the moving ring and the fixed ring of the bearing comprise a straight cylindrical geometry so that a front face of the moving ring of the bearing facing an interior of the hub is perpendicular to the bearing axis.

6. The wind turbine with blade pitch system of claim 5 wherein the front face of the moving ring of the bearing facing the interior of the hub comprises recesses parallel to the rear face of the driving plate positioned in contact with the at least one blade, where the nuts rest.

7. The wind turbine with blade pitch system of claim 4 wherein a stretch of the holes which pass through the moving ring of the bearing forms an angle with the bearing axis equal to an angle formed between the rear face and the front face of the driving plate.

8. The wind turbine with blade pitch system of claim 1 further comprising a shaft or ball joint system connecting the actuator with the driving plate which is at least partially integrated as a protrusion on said driving plate, forming a single part.

9. The wind turbine with blade pitch system of claim 8 wherein the shaft or ball joint system connecting the actuator with the driving plate is fully integrated into said driving plate.

10. The wind turbine with blade pitch system of claim 8 wherein the actuator is joined to the hub at a first end of said actuator, and joined to one end of the protrusion on the driving plate at a second end of the actuator.

11. The wind turbine with blade pitch system of claim 10 wherein the shaft or ball joint system is a cylindrical pin joined to the driving plate by thermal interference and machined to allow a clearance between a crankpin of the actuator and the shaft or ball joint system.

12. The wind turbine with blade pitch system of claim 11 wherein the attachment between the cylindrical pin and the protrusion is adjacent to the crankpin of the actuator.

13. The wind turbine with blade pitch system of claim 8 wherein the single machine piece making up the shaft or ball joint system and the driving plate is cast-manufactured.

\* \* \* \* \*